Figure 3:
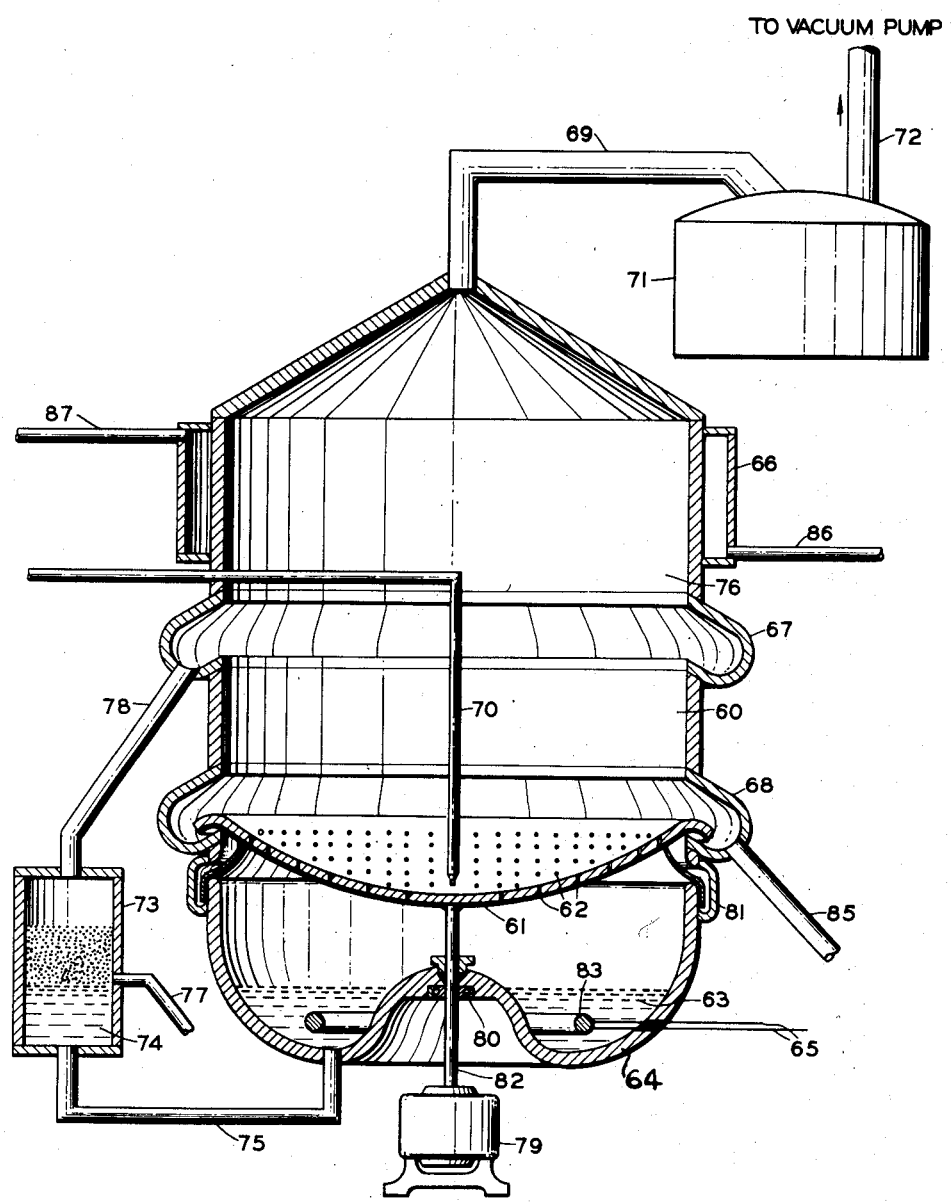

Aug. 4, 1953  W. B. WHITNEY  2,647,862
PROCESS AND APPARATUS FOR VACUUM DISTILLATION
Filed Sept. 13, 1948  2 Sheets-Sheet 1
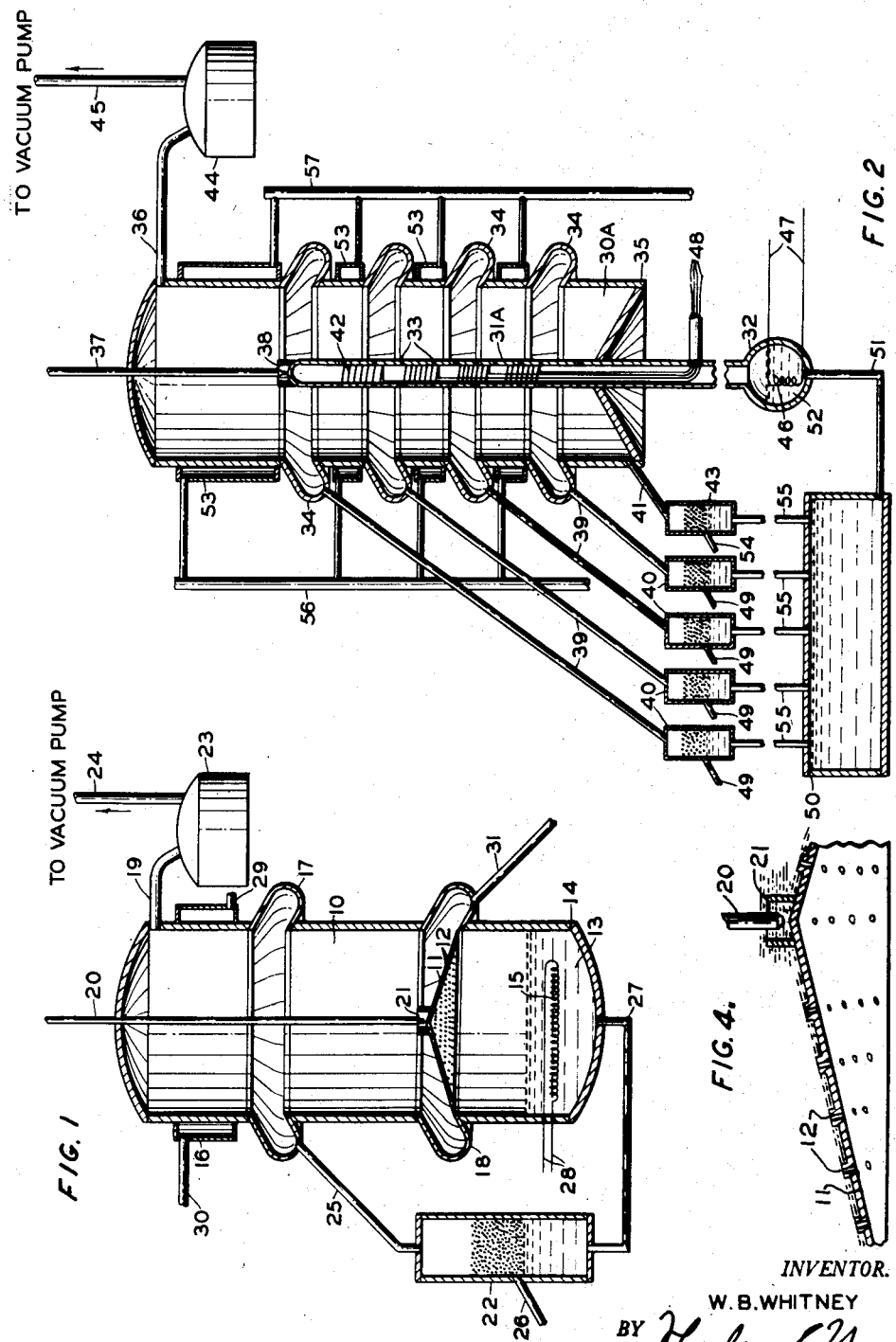
INVENTOR.
W. B. WHITNEY
BY Hudson & Young
ATTORNEYS Aug. 4, 1953 W. B. WHITNEY 2,647,862
PROCESS AND APPARATUS FOR VACUUM DISTILLATION
Filed Sept. 13, 1948 2 Sheets-Sheet 2

INVENTOR.
W. B. WHITNEY
ATTORNEYS

Patented Aug. 4, 1953

2,647,862

UNITED STATES PATENT OFFICE 2,647,862

PROCESS AND APPARATUS FOR VACUUM DISTILLATION

William B. Whitney, Bartlesville, Okla., assignor to Phillips Petroleum Company, a corporation of Delaware Application September 13, 1948, Serial No. 48,971

11 Claims. (Cl. 202—46)

This invention relates to the distillation apparatus for use under high vacuum. In one of its more specific aspects it relates to a method for carrying out high vacuum distillation of difficultly distillable materials.

Molecular distillation consists of subjecting a substance of low vapor pressure to such reduced pressures that the distance between the evaporating surface and the condensing surface is less than the mean free path of the molecules. The smaller the pressure in the space above the evaporating surface the greater is the mean free path. In order to make this distance of sufficient magnitude to be practical the pressure above the evaporating surface must be very low, of the order of $1\times10^{-4}$ mm. of mercury. This low pressure must be obtained by a combination of mercury diffusion pumps and fore pumps as neither type alone is capable of producing the desired degree of vacuum.

In molecular distillation apparatus common to the art the distilland, distributed in thin layers, is heated in a high vacuum and the more volatile portion caused to evaporate quietly and to condense on a condenser placed at a distance not much greater than the mean free path of the molecules. The desired vacuum is secured by operating diffusion and fore pumps which are connected to the distillation chamber by large passageways so that uncondensed gas molecules can diffuse rapidly to the pumps. Especially in large installations the distance between evaporating surface and the pumps may be fairly long which hinders the evacuation process.

My invention consists in placing internal diffusion pump orifices in close proximity to the evaporating surface of the distilland so that the evaporating stream of mercury vapor or other liquid used in the internal diffusion pump will entrain both residual gases and the evaporating molecules and carry them along until the mixed vapor stream reaches a condensing surface. The condensible gases are condensed by the condenser and the non-condensible gases are compressed and caused to move out through the exhaust opening where they may be picked up by the fore pump. As a result of position and size of the orifices the vapor molecules of the internal diffusion pump liquid acquire a high velocity approximately perpendicular to the surface of the evaporating liquid and, hence, they entrain and carry the evaporating molecules a distance which may be much greater than the mean free path of the evaporating molecules; it is, therefore, not necessary that the condenser be placed at a distance less than the mean free path of the molecules being evaporated from the evaporating surface. Since the distance between the evaporating surface and condenser may be greater than the mean free path of the evaporating molecules, the process is not entirely comparable to the usual form of molecular distillation. The evaporation of the molecules is not altered by my process except in as far as an improved vacuum is obtained but the evaporated molecules are entrained and carried along by the internal diffusion pump vapors and are not dependent upon the close proximity of the condenser.

A further advantage of my invention is that the sensible heat of a portion of the diffusion pump vapors may be used to furnish heat for vaporizing the distilland. The heated diffusion pump vapors may be made to impinge on the lower surface of a plate holding the distilland and thereby heat the distilland to the proper temperature for the rate of evaporation desired. The temperature of the internal diffusion pump vapors may be that corresponding to saturated vapors at the boiling point under the pressure existing in the internal diffusion pump still pot, or it may be higher if additional heat is applied to the vapors. The pressure in the internal diffusion pump boiler may be regulated by varying the heat input and the size of the orifices through which the diffusion gas passes.

A further advantage is that the heat used may originate from steam or a gas flame instead of the more expensive electrical heat.

The gaseous mixture composed of vapors from the internal diffusion pump liquid and from the distilland are condensed by a conveniently placed condenser and the combined condensate is withdrawn. In most cases the two substances are immiscible, for example, when mercury is used as the internal diffusion pump liquid during the distillation of an organic liquid. The internal diffusion pump liquid may be separated and returned to the internal diffusion pump boiler and the distillate may be withdrawn by suitable means. In special cases it may be desirable to use as an internal diffusion pump liquid, for example, dibutylphthalate, which is miscible or partially miscible with the distillate in which case it may be necessary to use special methods to separate the two liquids, for example, by extraction or by chemical treatment.

An object of my invention is to devise a process for carrying out a distillation under high vacuum. Another object of my invention is to provide an apparatus in which to carry out the distillation under high vacuum. Still another object of my invention is to provide an apparatus and a method of operation for the distillation of difficultly distillable materials under high vacuum wherein high capacity throughputs per unit of apparatus volume may be realized. Still other objects and advantages will be obvious to those skilled in the art upon reading the following disclosure, which, taken with the accompanying drawing, forms a part of this specification.

In the drawing, Figure 1 is a diagrammatic view, partly in section and partly in elevation, of one form of apparatus of my invention. Figure 2 is a diagrammatic view, partly in section and partly in elevation, of another form of the apparatus of my invention. Figure 3 is a diagrammatic view, partly in section and partly in elevation, of still another form of apparatus of my invention. Figure 4 is a vertical sectional view, partially in elevation, of still another form of apparatus of my invention.

Referring now to the drawing and particularly to Figure 1, this apparatus consists of an elongated vertically disposed cylindrical chamber 10 divided into an upper portion and a lower portion by a conical shaped evaporating plate 11. This plate contains at least one orifice, but preferably a plurality of orifices 12. These orifices are suitable for the passage of internal diffusion pump vapors, such as vapors of mercury, arising from an internal diffusion pump liquid 13 contained in the lower or boiler section 14 of chamber 10. A heater 15, such as an electrical resistance heater, may be positioned in the boiler section for heating the internal diffusion pump liquid. Lead wires 28 conduct electrical current from a source, not shown, to the heating element 15.

A condenser 16 surrounds an upper section of the vessel and the condenser is provided with an inlet and an outlet 29 and 30, respectively, for the flow of cooling liquid. An annular receiver ring member 17 is provided, as shown, to collect liquid material draining from the condensing surface. An annular receiver ring 18, similar to ring 17, serves to collect undistilled residue flowing from the lower edge of the evaporating plate 11. Tube 31 transfers the undistilled liquid from the ring 18 to a tank or vessel, not shown. A conduit 19 connects the distillation zone above the plate 11 with a suitable trap 23 which in turn is connected by pipe 24 to external diffusion and fore pumps, not shown. A conduit 20, for leading degassed and preheated distilland from a source, not shown, into the apparatus. This tube 20 discharges this distilland into a distribution ring 21 at the central point of the evaporating plate 11. A conduit 25 is provided for passage of condensed material from ring 17 into a run reservoir 22. Run reservoir 22 is provided with two tube connections 26 and 27. Tube connection 26 is positioned at about the mid-section of the reservoir 22 while tube 27 leads from the bottom of this reservoir into the bottom of the still section 14 of the chamber 10.

In the operation of the molecular still of Figure 1, such an internal diffusion pump material as mercury is charged into the lower portion of the apparatus as shown. The fore pump is operated to evacuate at least partially the apparatus and then the external diffusion pump is placed in operation. Electric current is passed through resistance coil 15 for heating the mercury to its boiling temperature under the pressure existing within the vessel. Vapors of the boiling internal diffusion pump liquid pass through the orifices 12 and sweep back the residual gases remaining in the upper section of the vessel 10 causing them to be removed through the exhaust outlet 19. The internal diffusion pump vapors are condensed by condenser 16 and the condensate flows by gravity into the annular receiving ring 17 and thence through the conduit 25 into the run separator 22 and thence back into the boiler 14. When the pressure has been reduced sufficiently, the degassed and preheated distilland is introduced into the apparatus through the conduit 20 to the distributing ring 21. The distilland then flows out from this ring in a thin film over the evaporating disk 11 which has been heated to operating temperature by the mercury vapor in contact with its under-surface. The molecules evaporating from the distilland diffuse from the evaporating surface in an upward direction and the streams of mercury vapors coming through the orifices 12 sweep the evaporating molecules in a generally upward direction toward the condenser 16. The orifices 12 are so positioned in the plate 11 that they are some less in distance from any point of the evaporating liquid surface than the mean free path of the molecules being evaporated. The mixed vapors are condensed by the condenser 16 and the mixed condensate accumulates in the annular ring 17 and flows by gravity through conduit 25 into the run accumulator 22. When mercury is the internal diffusion pump liquid and the liquid being distilled is an organic liquid, the mixed condensate may separate by gravity in vessel 22. The organic liquid may be removed through outlet 26 to further treatment or to such disposal as desired. The internal diffusion pump liquid, mercury, flows by gravity through conduit 27 into the boiler section 14.

Referring now to Figure 2 of the drawing, this embodiment of my invention comprises an elongated cylindrical chamber 30A in which is positioned centrally an elongated tube 31A which contains at least one, but preferably a plurality of orifices 33 suitable for use as diffusion vapor outlets. An internal diffusion liquid boiler 32 communicates with the lower end of the tube 31A so that the internal diffusion pump vapors may enter the tube 31A, thus heating the tube and the vapors may pass outward through the orifices 33 in order to evacuate the chamber 30A. These orifices 33 may preferably be inclined upward, as shown, which positioning expedites evacuation of the apparatus and subsequent operation. Some condensers 53 surround portions of the chamber 30A as shown. Annular receiving rings 34 are positioned around the vessel in such a manner that one ring is immediately below each condensing section. A reservoir 35 at the base of the chamber 30A serves to collect undistilled material which may pass through conduit 41 into a run accumulator 43. A conduit 36 connects the chamber 30A with a suitable trap, for example, tank 44, which in turn through pipe 45 connects with suitable external diffusion and fore pumps, not shown. A conduit 37 is disposed through the top of the vessel 30A for leading degassed and preheated distilland to a distribution ring 38 positioned at the top point of the tube 31A. Conduits 39 connect the annular receiving rings 34 and the run accumulators 40. Conduits 55 connect the bottom section of the accumulators 40 and the accumulator 43 with a reservoir 50. Conduit 51 connects the bottom of this reservoir 50 with the boiler section 32 at the end of the column 31A. Suitable heaters 42, for example, electric resistance heaters, positioned at the points illustrated in the pipe 31A, are for superheating the internal diffusion vapors rising within the pipe 31A. These heaters are so regulated that there is only a gradual decrease in temperature from the bottom of tube 31A to the top of this tube. An electrical resistance heater 46 may be positioned within the boiler section 32 for heating the internal diffusion pump liquid 52. Connections 47 with the resistance element 46 serve to conduct electrical current from a source, not shown. Wires 48 connecting with the several heating elements 42 serve to conduct electrical current also from a source, not shown, to said heating elements.

The internal diffusion vapor orifices 33 in the tube 31A are so spaced that any portion of the evaporating film of liquid is at a distance not appreciably greater than the mean free path of the evaporating molecules from the nearest diffusion vapor stream. The molecules of evaporating liquid are entrained and swept toward the condensers. The size of the orifices, the boiler and heater inputs are so adjusted that a suitable vapor stream issues from all these orifices simultaneously.

The operation of this embodiment of apparatus will be apparent from the description of operation of the embodiment of Figure 1. The mercury or other internal diffusion pump liquid is vaporized by heating and as these vapors rise up the tube 31A they are preferably further heated in order to minimize condensation and refluxing in this tube. With these superheated vapors in tube 31A there is a gradual cooling of the vapors as they ascend and contact the inner walls of the tube and the cooler distilland from ring 38 descends the outer wall of the tube 31A and becomes progressively hotter as it progresses down the tube. This gradation of temperature for the distilland flowing down the evaporator tube causes the more volatile components to vaporize near the top of the evaporator and be condensed by the upper condenser 53 and collect in the upper ring 34. As the distilland flows progressively downward it becomes hotter and components of lesser volatility vaporize and are collected in the progressively lower annular rings 34.

A third embodiment of my invention illustrated in Figure 3 of the drawing comprises an apparatus similar to that shown in Figure 1 excepting that the evaporating plate 61 is a rotating disk sealed by a suitable seal 81 to prevent internal diffusion pump vapors from passing upward between the outer periphery of the rotating disk and the inner wall of the chamber 76. The rotating disk may be planar or may be concave upward. The rotating disk may be supported on the end of a shaft 82 which passes through the bottom of the vessel 76 at point 80. This point 80 is intended to represent a bearing and packing gland assembly to prevent leakage and to permit easy rotation of the shaft. A source of motive power 79 as for example, an electric motor, may turn the shaft 82. This vessel 76 of Figure 3 contains at its upper portion an outlet pipe 69 which is connected with vessel 71 as a trap. A pipe 72 connects this trap to suitable evacuating pumps, not shown. A condenser 66 surrounds the upper portion of the vessel while a ring 67 just below this condenser serves to receive condensate. Conduit 78 connects this ring 67 with a run accumulator 73. Conduit 77 is for passage of liquid distilland from the accumulator 73 to further processing or disposal, as desired. Condensed internal diffusion pump liquid, such as mercury, may accumulate in the lower portion 74 of the vessel 73. A conduit 75 leads this latter liquid from vessel 73 to the boiler section 64 of the apparatus. An electrical heating element 83 in the boiler section 64 serves to heat the internal diffusion pump liquid. Electrical connection 65 conducts electrical current from a source, not shown, to the electrical heating element 83. The operation of this embodiment of my invention is similar to the operation of the apparatus of Figure 1 except that the distilland is distributed by centrifugal force over the rotating evaporator and undistilled residue is thrown from the periphery instead of these actions depending upon the force of gravity. If desired, suitable cups or vanes may be attached to the underside of the rotating evaporator disk to deflect internal diffusion pump vapors through the orifices with an augmented velocity.

Tube 85 conducts liquid from accumulator ring 68 to storage, not shown. Pipes 86 and 87 lead coolant into and from, respectively, the condenser 66.

The process of my invention may be applied to the separation of certain components from such difficultly distillable oils as lubricating oil stocks. Materials decomposible under atmospheric distillation temperatures may also be distilled or components removed therefrom by the process of my invention. An example of material of this latter type is fish oils or the like containing vitamin type materials. However, if mercury is used as the diffusion pump liquid in the treatment of medicinal or food products suitable processes must be used for removal of entrained or combined mercury. Other diffusion pump liquids, however, may be used in place of mercury, such as, dibutyl phthalate. This material is at least somewhat miscible with many organic compounds, hence phase separation of the distillate may need be replaced by other separation methods, as for example, extraction. The term "diffusion pump liquid" is used to designate a low vapor pressure liquid of the type used as the pumping fluid in diffusion pumps. The term "diffusion pump liquid," as defined herein, therefore, includes, in addition to mercury and dibutyl phthalate low vapor pressure oils, and silicone fluids such as those described as Octoil, Octoil-S, DC-702, DC-703, and Amoil-S or Amoil, as manufactured by the Central Scientific Company.

The perforations in the evaporator plates of my invention are preferably quite small, and may be of the order of 1 to 10 microns, and not appreciably more than 1 millimeter in diameter. Small perforations are desirable in order to realize a pressure drop through the evaporator plate. The orifices in the evaporators herein described may extend slightly beyond the evaporator surfaces in a downstream direction to prevent back flow of distilland. Such a structure is illustrated in Figure 4, in which it will be noted that the members defining the orifices extend upwardly a short distance from the plate 11, thereby inhibiting downward flow of the distilland through the perforations in the plate.

The distributing rings 21 and 38 may be so constructed and positioned that distilland may flow through or under or both from the rings to the evaporators.

The process as herein described may be operated at pressure somewhat higher than pressures normally used for molecular distillation since the sweeping action of the diffusion pump liquid is utilized. The exact pressure used will be dependent on the materials distilled but may be from $1\times10^{-4}$ mm. to as high as 1 mm. in some cases.

Materials of construction may be generally selected from those commercially available. Materials should possess sufficient mechanical strength that vessels made therefrom will withstand the vacuum required. Resistance to corrosion and contamination of products with products of corrosion should be considered.

Many modifications of the embodiments herein disclosed may be made without departing from the spirit and scope of my invention.

Having disclosed my invention, I claim:

1. A method for the distillation of a distilland comprising introducing liquid to be distilled into a first zone, providing a quantity of a diffusion pump liquid selected from the group of diffusion pump liquids consisting of mercury and dibutyl phthalate in a second zone disposed in general below said first zone, extending said distilland into the form of a thin film and supporting said thin film on a perforated solid surface forming a common boundary between said zones, maintaining a subatmospheric pressure in said first zone between the limits of $10^{-4}$ and 1 millimeter of mercury, maintaining the temperature of said thin film of distilland at a value below the boiling point of the distilland under the pressure maintained in the first zone, maintaining a condensing surface in said first zone at a distance from said thin film of distilland greater than the average means free path of the molecules in said thin film of distilland under the conditions of temperature and pressure maintained in said first zone, passing vapor of said diffusion pump liquid from said second zone through said perforations in a fixed direction toward said condensing surface and entraining therewith vapors of said liquid, condensing the vapors of distilland and vapors of said diffusion pump liquid, removing condensate from said first zone, and recovering condensed liquid as the product of the process.

2. A method for the distillation of a distilland comprising introducing liquid to be distilled into a first zone, providing a quantity of a diffusion pump liquid in a second zone disposed in general below said first zone, extending said distilland in to the form of a thin film and supporting said thin film on a perforated solid surface forming a common boundary between said zones, maintaining a subatmospheric pressure in said first zone between the limits of $10^{-4}$ and 1 millimeter of mercury, maintaining the temperature of said thin film of distilland at a value below the boiling point of the distilland under the pressure maintained in the first zone, maintaining a condensing surface in said first zone at a distance from said thin film of distilland greater than the average mean free path of the molecules in said thin film of distilland under the conditions of temperature and pressure maintained in said first zone, passing vapor of said diffusion pump liquid from said second zone through said perforations in a fixed direction toward said condensing surface and entraining therewith vapors of said liquid, condensing the vapors of distilland and vapors of said diffusion pump liquid, removing condensate from said first zone, and recovering condensed liquid as the product of the process.

3. In the method of claim 2 maintaining the vapors of the said diffusion pump liquid at a temperature higher than the temperature of said thin film of liquid.

4. In the method of claim 2 condensing a plurality of vapor fractions to form a plurality of condensates, and recovering a fraction of distilled liquid from each condensate as separate products of the process.

5. An apparatus for use in the distillation of liquid under high vacuum comprising, in combination, a fluid-tight vessel, an evaporator plate extending horizontally across said vessel and dividing it into a first compartment and a second compartment, said first compartment being disposed in general above said second compartment, said evaporator plate having perforations distributed throughout substantially the entire area thereof, and said second compartment being constructed and arranged to define a sump for liquid at the bottom thereof, means for introducing liquid distilland onto the upper surface of said evaporator plate, a heater in the sump of said second compartment to heat the liquid distilland on said evaporator plate and liquid in said sump, means for withdrawing liquid distilland from said evaporator plate, means for introducing a second liquid into said sump, a condenser disposed in said first compartment above said evaporator plate, and vacuum-producing means communicating with said first compartment above said condenser.

6. In the apparatus of claim 5, wherein the perforations in said perforated plate are from 1 micron to 1 millimeter in diameter.

7. The apparatus of claim 5 wherein the evaporator plate is rotatable around its vertical axis.

8. An apparatus for use in the distillation of liquid under high vacuum comprising, in combination, a fluid-tight vessel, a hollow tube having its top end closed and disposed vertically within said vessel, said vessel and said tube having a common axis, said tube having perforations distributed throughout substantially the entire area thereof, the wall of said tube dividing said vessel into a first compartment comprising the space within said fluid-tight vessel and outside of said tube, and a second compartment comprising the space within said tube, said second compartment being constructed and arranged to define a sump for liquid at the bottom thereof, means for introducing liquid distilland at the upper end of said tube so that it flows downwardly along the tube, a heater in the sump of said second compartment to heat the liquid distilland on said tube and liquid in said sump, means for withdrawing liquid distilland from the bottom of said tube, means for introducing a second liquid into said sump, a condenser mounted in said first compartment and spaced from said tube, and vacuum-producing means communicating within the top region of said first compartment.

9. The apparatus of claim 8 wherein a plurality of condensers are separately disposed one above the other around the interior side wall of said vessel, a conduit associated with each condenser for removing condensate therefrom, a gravity separator fed by each conduit, means for returning the bottom material from each separator to said sump, and means for withdrawing the lighter liquid from each separator as product.

10. The apparatus of claim 8 wherein the perforations have diameters between 1 and 10 microns.

11. An apparatus for use in the distillation of liquid under high vacuum comprising, in combination, a fluid-tight vessel, an evaporator plate extending horizontally across said vessel and dividing it into a first compartment and a second compartment, said first compartment being disposed in general above said second compartment, said evaporator plate having perforations distributed throughout substantially the entire area thereof, the surfaces defining the perforations in the evaporator plate extending slightly beyond the surfaces of said plate into the first compartment so as to be positioned in a downstream direction relative to the flow of fluid from the second compartment to the first compartment, and said second compartment being constructed and arranged to define a sump for liquid at the bottom thereof, means for introducing liquid distilland onto the upper surface of said evaporator plate, a heater in the sump of said second compartment to heat the liquid distilland on said evaporator plate and liquid in said sump, means for withdrawing liquid distilland from said evaporator plate, means for introducing a second liquid into said sump, a condenser disposed in said first compartment above said evaporator plate, and vacuum-producing means communicating with said first compartment above said condenser.

WILLIAM B. WHITNEY.

References Cited in the file of this patent

UNITED STATES PATENTS

| Number | Name | Date |
| --- | --- | --- |
| 1,849,496 | Magnus | Mar. 15, 1932 |
| 2,041,059 | French | May 19, 1936 |
| 2,150,684 | Hickman | Mar. 14, 1939 |
| 2,313,546 | Hickman | Mar. 9, 1943 |
| 2,343,665 | Hickman | Mar. 7, 1944 |
| 2,350,609 | Hackmuth | June 6, 1944 |
| 2,370,462 | Hecker | Feb. 27, 1945 |
| 2,383,176 | Willkie | Aug. 21, 1945 |
| 2,447,746 | Ferris | Aug. 24, 1948 |

FOREIGN PATENTS

| Number | Country | Date |
| --- | --- | --- |
| 464,900 | Germany | Sept. 5, 1928 |

OTHER REFERENCES

Berichte, Deutsche Chemische Gesellschaft, vol. 67, pgs. 1636–1640.

Morton, Laboratory Technique in Organic Chemistry, pbld. 1938 by McGraw-Hill Book Co., New York, New York, pgs. 142–146.